J. H. McNEIL.
AMALGAMATOR.
APPLICATION FILED JAN. 11, 1912.
1,182,189.
Patented May 9, 1916.
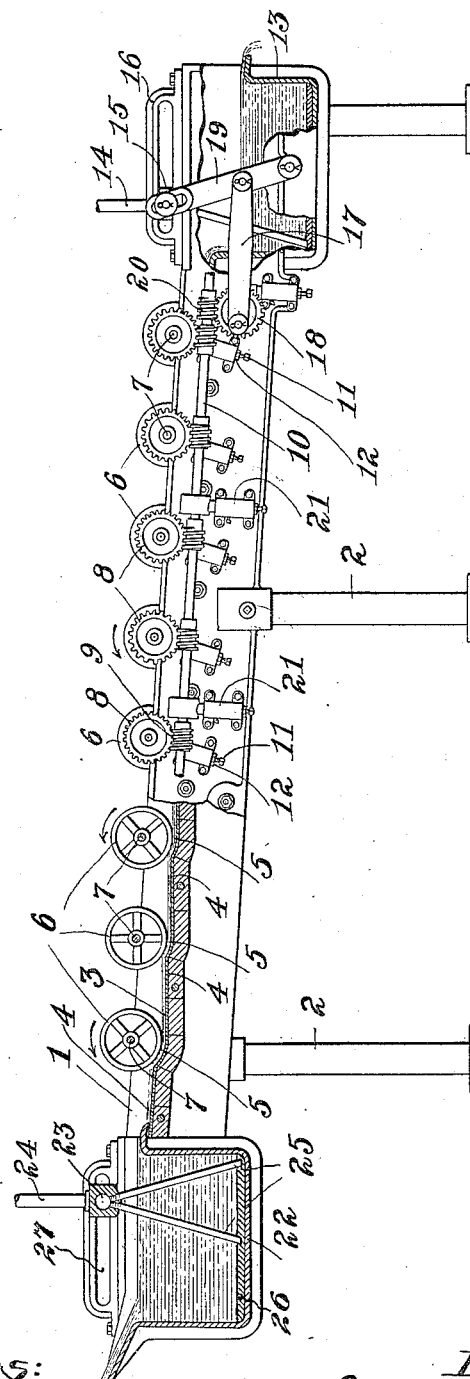

UNITED STATES PATENT OFFICE.

JOSEPH H. McNEIL, OF EAST SAUGUS, MASSACHUSETTS.

AMALGAMATOR.

1,182,189.

Specification of Letters Patent.

Patented May 9, 1916.

Application filed January 11, 1912. Serial No. 670,567.

*To all whom it may concern:*

Be it known that I, JOSEPH H. McNEIL, a citizen of the United States, residing at East Saugus, in the county of Essex and State of Massachusetts, have invented certain new and useful Improvements in Amalgamators; and I do hereby declare the following to be a full, clear, and exact description of the invention, such as will enable others skilled in the art to which it appertains to make and use the same.

The present invention relates to an improvement in amalgamators for use in gold mining and more particularly to the general type of amalgamators illustrated and described in the present inventor's United States Patent No. 970,536, dated September 20, 1910, which are used principally in the recovery of "flour gold."

In the amalgamator disclosed in the patent hereinbefore referred to, the auriferous material is washed over a plain surfaced amalgamated plate by a flow of water. The "flour" gold is picked up from the surface of the water by a series of amalgamated drums extending across the plate and arranged to rotate in the direction of the flow of the materials with their peripheries in contact with the surface thereof. In this arrangement the peripheries of the drums are presented tangentially to the surface of the materials, and therefore the gold recovering surface of each drum effective at one time is merely a straight line extending across the peripheral surface of the drum.

The object of the present invention is to improve the construction of amalgamators of the type described, and increase their efficiency of operation.

With this object in view a feature of the present invention contemplates the provision in an amalgamator for "flour gold," of a stationary trough formed with a bottom over which the auriferous matter is washed by a flow of water, a drum, or other rotary member, having an amalgamated surface arranged within and across the trough, said bottom being constructed and the rotary member arranged relatively thereto so that a substantial area of the peripheral surface of the member engages the surface of the water. With this construction a larger contacting surface between the periphery of the rotary member and the surface of the water is obtained than in the amalgamator illustrated and described in the patent referred to. The efficiency of the previous amalgamator may be represented graphically by a straight line and the efficiency of the present amalgamator by a rectangle. Obviously an important improvement in amalgamators is effected by the present invention.

In the preferred form of the amalgamator, a metallic plate provides the bottom of the trough through which the pulp is washed by a flow of water, and this metallic plate is formed with a stepped surface forming a series of curved depressions or off-sets, which may for convenience be called channels, extending transversely from side to side of the trough. A series of rotating drums is arranged in the trough so that their peripheries are maintained slightly separated from and concentric with the concaved surfaces of the channels. When the pulp flows over the plate it conforms to the shape of the channels and the concentric peripheral surface of the drums contact over a large area of the surface of the pulp and thus present at one time a substantial gold recovering surface effective for picking up the floating particles of gold.

In addition to the feature of the invention above referred to, the invention also consists in certain constructions and arrangements of parts as fully set forth hereinafter, the advantages of which will be obvious to those skilled in the art.

These and other features of the invention including certain details of construction and combinations of parts will be further explained in the following description and then particularly pointed out in the appended claims.

The various features of the invention will be readily understood from an inspection of the accompanying drawing which shows a side elevation of the amalgamator partly in section embodying the features of the invention in the best form at present advised.

In the embodiment of the invention illustrated in the drawing a stationary trough or sluice 1 is suitably mounted on standards 2. The bottom of the trough is provided with an amalgamated plate 3 formed with a series of shelves 4 and a series of channels 5 extending transversely across the trough. The bottom of the trough is thus formed in steps, and is designed to furnish a uniform flow of pulp through the trough. The sides of the trough 1 support a series of rotary drums 6 extending across the interior of the trough. The drums 6 are rigidly secured to shafts 7 which are each provided with a worm gear 8 which gears intermesh with worms 9 secured to a shaft 10 driven from a suitable source of power.

The peripheral surface and end of each of the drums are amalgamated and the shafts are arranged in the trough so that the peripheries of the drums rotate concentrically to the transverse channels of the plate. Each shaft 7 and its drum 6 may be raised and lowered to adjust the drum toward and away from the bottom of the trough by means of an adjusting screw 11 carried on opposite sides of the trough to engage the shafts 7. The adjusting screws 11 are angularly arranged on the trough so that the drums may be maintained concentric to the transverse channels as the drums are moved toward and away from the plate. The drums are separated from the plate a distance equal to the depth of the pulp washed through the trough, and are maintained in this adjustment by lock nuts 12 on each adjusting screw. The rotation of the shafts 7 is in the direction of the arrows so that the drums are caused to rotate in the direction of flow of the pulp through the trough or sluice. The surface speed of the drums is preferably just equal to the speed of flow of the pulp through the trough. This construction permits the amalgamated surfaces of the drums to keep steadily in contact with the surface of the pulp without any frictional disturbance of the mercury on the drums, thereby maintaining the amalgamated surfaces undisturbed and insuring a continued high efficiency for said surfaces. Stated in another way, this construction permits the amalgamated surfaces to pick up the floating particles of gold from the surface of the flowing pulp without interrupting the flow.

As shown in the drawing, the pulp conforms to the shape of the transverse channels as it flows from the shelves. As the peripheries of the drums move through arcs concentric to the channels while engaging the surfaces of the pulp, it is clear that a substantial area of the peripheral surface of the drums is effective at one time to recover the floating particles of gold. This effective surface may be described as a rectangular portion of the peripheral surface of the drums.

In order to recover any mercury or amalgam which is washed off of the amalgamated surfaces of the drums or bottom plate 3, the discharge end of the trough 1 is provided with a trap 13, the rear wall of which forms a weir at the end of the trough, against which mercury, amalgam and tailings are delivered. Above this trap there is provided a water conduit supplied through a pipe 14 and provided with bearing blocks 15 at its ends, resting in guideways formed by slots in brackets 16 projecting from the sides of the trough. The conduit is reciprocated within its guideways by means (only half of which is shown) comprising a pitman 17, one end of which is pivoted to a worm gear 18 and the other end of which is pivoted to a link 19, which is pivoted to the trough at one end and has a slot and link connection with the bearing block 15 at the other. The worm gear 18 is mounted on the end of a transverse shaft and is rotated from a worm 20 on the driving shaft 10. For the same purpose as in the patent referred to, a series of discharge nozzles depend from the conduit and project downward through the material in the trap and substantially to the plane of the floor of the trap below the surface of any mercury which may be in said trap.

In order to maintain the driving connections when the shafts 7 are adjusted for different depths of material, the shaft 10 is carried in adjustable hangers 21. The shaft for the worm gear 18 is also adjustable to maintain the connections between the worm 20 and the worm gear 18.

The amalgamator just described is intended to operate conjointly with an amalgamating stamp mill. In mills of this type the auriferous material is crushed by a series of stamps in the presence of water and mercury. This mercury is broken up by the stamps into fine globules, and a film of air around each globule prevents their reuniting and floats them off in the waste water. This source of loss is called "flouring", and the floating mercury is called "flour" mercury for the same reason that the floating gold is called "flour" gold.

In order that the auriferous material may be crushed in a non-amalgamating stamp mill and the gold completely recovered by the amalgamator shown in the drawing, an amalgamating trap 22 is secured to the receiving end of the trough 1 in position to receive the pulp flowing from the mill. The bottom of this trap is covered with mercury 26 to a depth sufficient to cover the discharge ends of nozzles 25 carried by a conduit 23 which is provided with a receiving pipe 24. In order to break the film of air around the minute globules of "flour" gold so that the particles may become wet and sink quickly and amalgamate in the mercury 26, the conduit 23 is reciprocated in guideways 27 by connections from the shaft 10 similar to the connections for reciprocating the blocks 15. Agitation of the pulp loosens the gold therein and maintains the pulp free from lumps. As the provision of the trap 22 and its stirrer insures a uniform flow of pulp through the trough, the drums may be rotated in a direction opposite to the direction of the arrow.

The provision of the trap 22 on the amalgamator is also of advantage when the amalgamator operates upon tailings which have been previously milled and dumped. When operating upon old tailings and fresh pulp flowing from an amalgamating mill the drums are rotated in the direction of the arrows. When operating upon fresh pulp flowing from a non-amalgamating mill the drums are rotated in a direction opposite to that of the arrows.

What is claimed as new is:—

1. An amalgamator for "flour gold" having, in combination, a downwardly inclined trough formed with a bottom arranged to secure a uniform flow of pulp throughout its length, means to feed a thin stream of uniform depth across the trough, the bottom of said trough consisting of a plurality of plane surfaces connected by an unobstructed conduit comprising a curved surface connecting the plane surfaces, and a rotatable drum mounted concentric to the curved surface and spaced from the bottom a distance equal to the depth of the stream.

2. An amalgamator for "flour gold" having, in combination, a trough for securing a uniform flow of pulp throughout its length, comprising a plurality of plane surfaces connected by unobstructed conduits, said conduits consisting of curved surfaces connecting the plane surfaces, and rotatable drums having unobstructed surfaces adjustably mounted above the curved surfaces to maintain a flow of pulp through the conduit equal to the depth of flow on the plane surfaces, and means to feed a thin stream of uniform depth across the bottom of said trough.

3. An amalgamator for "flour gold" having, in combination, a trough, means for feeding a thin stream of pulp of uniform depth across the bottom of the trough, said trough having an amalgamated bottom collecting surface comprising a plurality of connected plane surfaces arranged in stepped relation to one another, and an amalgamated top collecting surface arranged to contact the top of pulp flowing through the trough comprising a plurality of rotatable drums mounted opposite the end of each step and adjustable toward and from the bottom of the trough to maintain a flow of pulp from one plane surface to the next of equal depth to the flow of pulp on the plane surfaces.

4. An amalgamator for "flour gold," having, in combination, a stationary trough, formed with a bottom comprising a plurality of plane shelves in stepped formation, a series of rotating drums arranged above said trough bottom, one drum opposite the adjoining ends of each adjacent pair of shelves, and a channel connecting said adjoining ends and forming the riser between adjacent steps, the curve of said channel being concentric with the periphery of the drum opposite thereto.

5. An amalgamator for "flour gold," having, in combination, a stationary trough having a bottom comprising a plurality of parallelly arranged shelves each connected to each by a concavely curved, transverse channel, forming a series of steps designed to furnish a flow of pulp of uniform depth through the trough, and a series of rotary drums arranged one opposite each channel with their curved surfaces parallel to the curvature of the channels and spaced therefrom a distance equal to the depth of the flowing pulp.

6. An amalgamator for "flour gold," having, in combination, an inclined stationary trough arranged to secure a uniform uninterrupted flow of pulp on the bottom throughout its length, a series of rotatable drums having unobstructed collecting surfaces mounted above the bottom of said trough, a plurality of plane surfaces in the bottom of said trough, and a plurality of curved off-sets connecting said surfaces, said off-sets being concentric to said drums, means for adjusting the drums concentrically to the off-sets, and means for feeding a thin stream of uniform depth across said bottom at the top of the trough.

7. An amalgamator for "flour gold" having, in combination, a downwardly inclined trough having an amalgamated collecting bottom surface comprising a series of connected plane surfaces which are offset from one another, means for feeding a thin stream of uniform depth across said bottom at the top of the trough, and a plurality of rotatable drums having unobstructed amalgamated collecting surfaces arranged opposite each offset, said drums being of sufficient height to force the pulp under them and spaced from the bottom of the trough to maintain a flow of pulp at each offset equal to the depth of the flow of pulp on the plane surfaces.

JOSEPH H. McNEIL.

Witnesses:
EMILY M. NUNN,
WARNER G. OGDEN.

Copies of this patent may be obtained for five cents each, by addressing the "Commissioner of Patents, Washington, D. C."